US005639539A

United States Patent [19]

DeProspero et al.

[11] Patent Number: 5,639,539

[45] Date of Patent: Jun. 17, 1997

[54] WALL COVERING

[75] Inventors: David A. DeProspero, Strongsville, Ohio; Thadeus Banas, Pawtucket, R.I.; Richard P. Muny, Kirtland Hills; Robert L. Frye, Concord, both of Ohio

[73] Assignee: Imperial Wallcoverings, Cleveland, Ohio

[21] Appl. No.: 564,722

[22] Filed: Nov. 29, 1995

[51] Int. Cl.$^{6}$ .......... B32B 9/00

[52] U.S. Cl. .......... 428/195; 428/137; 428/145; 428/150; 428/192; 428/202; 428/204; 428/319.7; 428/327; 428/352; 428/421; 428/424.4; 428/424.6; 156/244.16; 156/276; 156/283

[58] Field of Search .......... 424/94, 192, 202, 424/327, 352, 355, 354, 137, 195, 421, 145, 147, 149, 424.4, 159, 424.6, 518, 204, 319.7; 156/327, 283, 625, 632, 648, 654, 244.16, 276, 277

[56] References Cited

U.S. PATENT DOCUMENTS

| | | | |
|---|---|---|---|
| 3,275,469 | 9/1966 | Streit | 117/76 |
| 3,620,366 | 11/1971 | Parkinson et al. | 206/590 C |
| 3,725,122 | 4/1973 | Reinhard et al. | 117/122 P |
| 3,855,052 | 12/1974 | Mestetsky | 161/167 |
| 3,922,464 | 11/1975 | Silver et al. | 428/355 |
| 4,018,260 | 4/1977 | Baslow | 160/327 |
| 4,038,454 | 7/1977 | Lehmann et al. | 428/356 |
| 4,054,697 | 10/1977 | Reed et al. | 428/40 |
| 4,151,319 | 4/1979 | Sackoff et al. | 428/40 |
| 4,157,418 | 6/1979 | Heilmann | 428/355 |
| 4,166,152 | 8/1979 | Baker et al. | 428/522 |
| 4,339,485 | 7/1982 | Shibano et al. | 428/40 |
| 4,355,074 | 10/1982 | Stemmier et al. | 428/350 |
| 4,440,830 | 4/1984 | Wempe | 428/352 |
| 4,471,082 | 9/1984 | Kwok et al. | 524/46 |
| 4,495,318 | 1/1985 | Howard | 524/375 |
| 4,504,550 | 3/1985 | Pook | 428/461 |
| 4,548,845 | 10/1985 | Parsons et al. | 428/40 |
| 4,598,112 | 7/1986 | Howard | 524/78 |
| 4,650,704 | 3/1987 | Rothenberg | 428/40 |
| 4,783,354 | 11/1988 | Fagan | 428/40 |
| 4,804,572 | 2/1989 | Bodrogi | 428/195 |
| 4,844,972 | 7/1989 | Tedeschi et al. | 428/246 |
| 4,900,604 | 2/1990 | Martinez et al. | 428/79 |
| 4,925,908 | 5/1990 | Bernhard et al. | 526/320 |
| 4,943,461 | 7/1990 | Karim | 428/40 |
| 4,961,993 | 10/1990 | Mudge | 428/343 |
| 4,985,488 | 1/1991 | Landin | 524/555 |
| 5,000,810 | 3/1991 | Silverstein | 156/238 |
| 5,050,529 | 9/1991 | Pardee | 118/40 |
| 5,196,246 | 3/1993 | Kauss et al. | 428/39 |
| 5,246,762 | 9/1993 | Nakamura | 428/172 |
| 5,296,277 | 3/1994 | Wilson et al. | 428/40 |
| 5,362,516 | 11/1994 | Wilson et al. | 427/207.1 |
| 5,362,816 | 11/1994 | Snyder et al. | 525/329.9 |
| 5,441,784 | 8/1995 | Smith | 428/40 |

FOREIGN PATENT DOCUMENTS

| | | |
|---|---|---|
| 1333710 | 10/1973 | United Kingdom . |
| 2054472 | 2/1981 | United Kingdom . |

*Primary Examiner*—Patrick Ryan
*Assistant Examiner*—Abraham Bahta
*Attorney, Agent, or Firm*—Bell, Seltzer, Park & Gibson

[57] ABSTRACT

The present invention is directed to a releasable wall covering and a method of producing the same. The wall covering comprises a reinforcing backing layer with a surfacing layer formed of a polymer coating overlying a front surface of the backing layer. A layer of printing is applied to the surfacing layer with a transparent top coating overlying the printing layer. A pressure sensitive adhesive layer formed of tacky polymeric microspheres is present on the rear surface of the backing layer so as to allow the wall covering to be repositionable upon installation and releasable after an extended time.

18 Claims, 2 Drawing Sheets

WALL COVERING

FIELD OF THE INVENTION

The present invention relates to wall coverings, and more particularly, to a wall covering having a pressure sensitive adhesive applied thereto so as to allow the wall covering to be repositionable and releasable.

BACKGROUND OF THE INVENTION

Wall coverings which serve to decorate and protect the underlying wall surface have been widely employed. Wall covering materials of this general type have traditionally been prepared by coating a base sheet with a water-based adhesive including, for example, a wallpaper paste. Such materials, however, have been found to be disadvantageous since they are cumbersome and difficult to handle due to the sloppy, damp nature of the water-based adhesive. As a result, pressure sensitive adhesives have been employed in securing wall coverings as described, for example, in U.S. Pat. Nos. 3,620,366 to Parkinson and 4,783,354 to Fagan. In general, by using these adhesives, a homeowner may readily apply a wall covering without the time, effort, and skill involved in using wet adhesives.

Nonetheless, wall coverings attached with pressure sensitive adhesives suffer from various drawbacks. For example, when a wall covering has been in place for a prolonged period of time, it is often difficult to remove the covering without harming the underlying surface or without leaving an excess of adhesive. Accordingly, stripping aids have been used. Repositioning of the wall covering after being attached to the wall is also troublesome in that it often bubbles and wrinkles. With respect to decorative coverings, this problem is especially troublesome since repositioning may be necessary in order to achieve maximum ornamental effect. Moreover, if adhesive surfaces are inadvertently bonded together, it is extremely difficult to separate the corresponding wall coverings.

Therefore, it is an object of the present invention to provide a wall covering with a decorative and protective surface with a pressure sensitive adhesive which the wall covers such to be easily removed after extended use.

It is a further object of the present invention to provide a wall covering with a decorative and protective surface with a pressure sensitive adhesive such that the wall covering may be repositioned during installation with minimal surface distortion.

It is yet a further object of the present invention to provide a wall covering with a decorative and protective surface with a pressure sensitive adhesive which allows the wall covering to be readily separated from another wall covering in the event the two surfaces become attached.

SUMMARY OF THE INVENTION

The present invention provides a decorative and protective wall covering with a pressure sensitive adhesive applied to the back thereof which allows the wall covering to be readily repositionable during installation, removable after an extended period of use, and separated from another wall covering if the two come into contact. The releasable wall covering comprises a reinforcing layer or substrate, a surfacing layer formed of a polymer coating overlying a front surface of the backing layer, a layer of printing applied to the surfacing layer which imparts a desired decorative pattern to the wall covering, a transparent top coat layer overlying the layer of printing, and a pressure sensitive adhesive layer formed of tacky polymeric microspheres underlying a rear surface of the backing layer.

In a preferred embodiment, the releasable wall covering further comprises a polymeric primer layer positioned between the pressure sensitive adhesive layer and the rear surface of the reinforcing backing layer. The primer layer serves to improve anchorage of the adhesive to the printed paper.

The present invention also provides a method for producing the releasable wall covering. The method includes providing a reinforcing backing layer and applying a surfacing layer to a front surface of the backing layer. A transparent top coat layer is then applied over the layer of printing. A pressure sensitive adhesive layer comprising polymeric microspheres is formed on a rear surface of the reinforcing layer to provide a releasable wall covering. Preferably, the formation of the pressure sensitive adhesive layer is carried out by depositing pressure sensitive adhesive comprising polymeric microspheres to the rear surface of the reinforcing backing layer. The pressure sensitive adhesive is then subjected to conditions sufficient to dry the pressure sensitive adhesive and to cure the polymeric material forming the microspheres. The wall covering is then exposed to a humid environment such that the paper is remoisturized through the pressure-sensitive adhesive to ensure good performance.

BRIEF DESCRIPTION OF THE DRAWINGS

Some of the features of the invention having been stated, others will become apparent from the detailed description which follows, and the accompanying drawings in which.

DETAILED DESCRIPTION OF THE PREFERRED EMBODIMENTS

Figure 1:
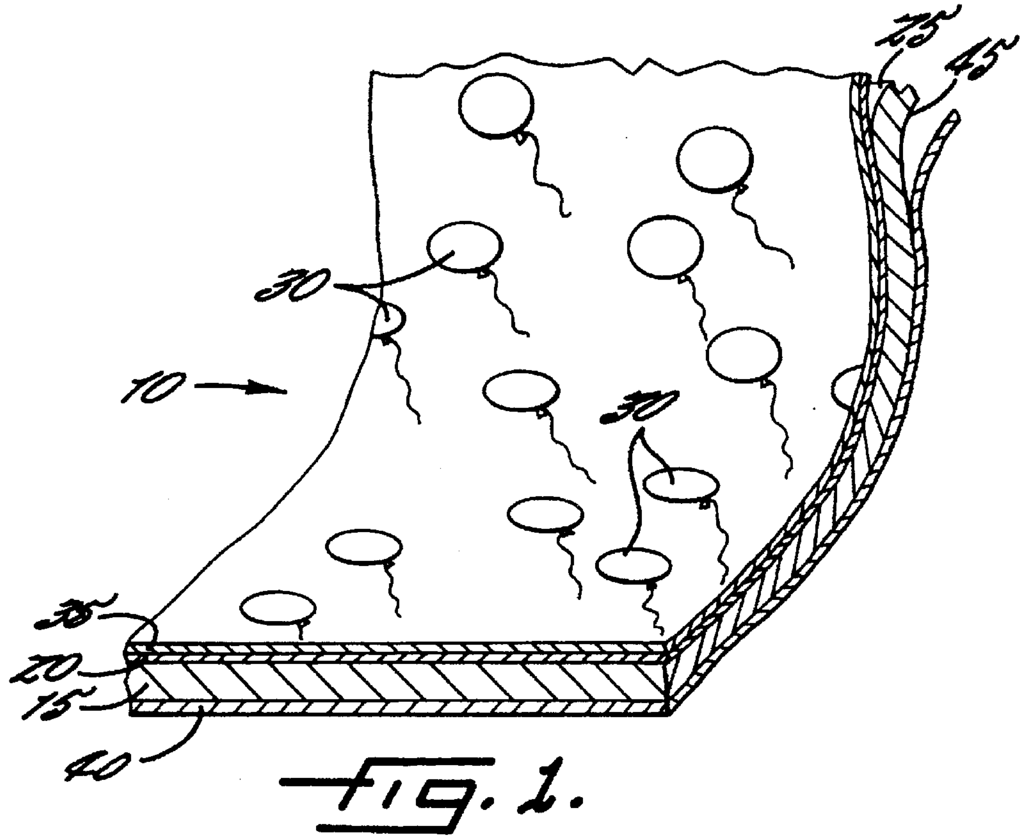
FIG. 1 is schematic view showing a releasable wall covering in accordance with the present invention.
Figure 2:
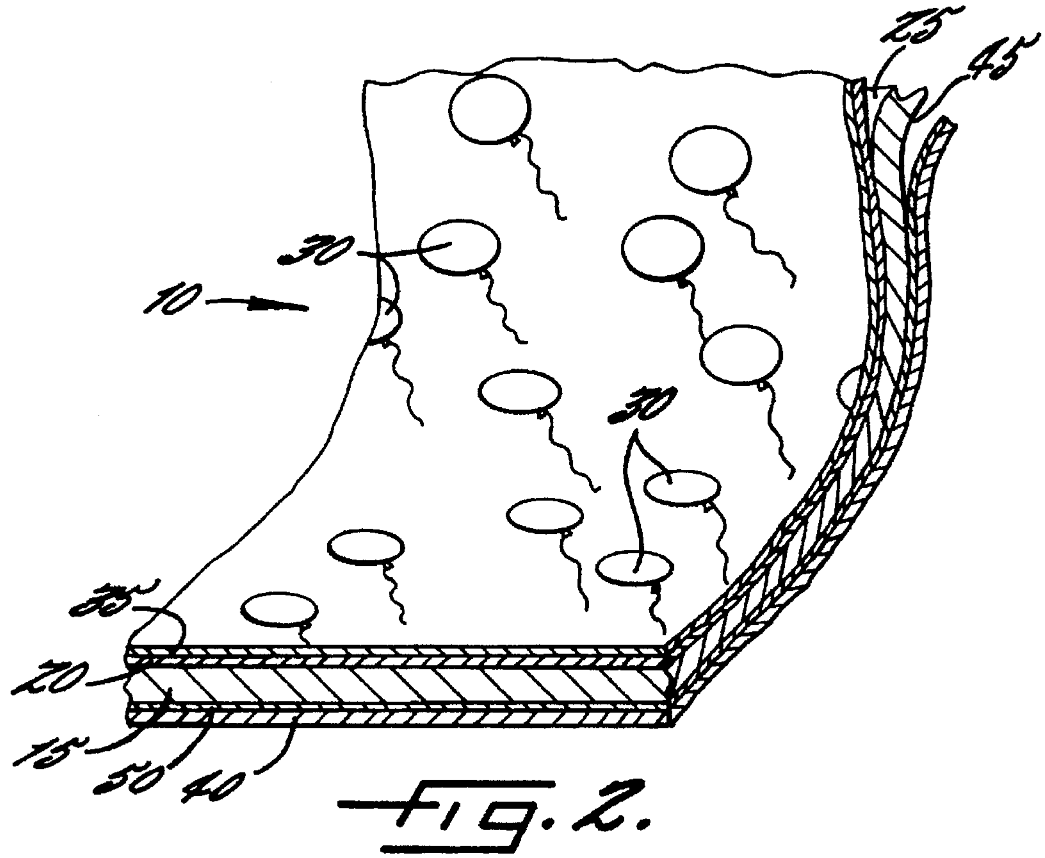
FIG. 2 is a schematic view of the wall covering similar to FIG. 1 with a primer layer positioned between the backing layer and the pressure sensitive adhesive layer.

Referring now more particularly to the drawings, FIGS. 1 and 2 illustrate a wall covering in accordance with the present invention which is indicated generally by the reference character 10. The wall covering 10 includes a reinforcing substrate or backing layer 15, which has a surfacing layer 20 formed of a polymer coating overlying the front surface 25 of the substrate layer 15 to form a smooth background surface. A layer of printing 30 is applied directly to the surfacing layer 20. Depending upon the particular pattern involved and the number of colors employed, the printing layer 30 may extend either over the entire surface or over selected portions only of the surfacing layer 20. When multiple colors are employed, the printing layer 30 may include areas where multiple colors overlie one another. Overlying the printing is a transparent top coat layer 35 which extends over substantially the entire outer surface of the wall covering 10. Preferably, this top coat layer 35 is substantially transparent and stain resistant. A pressure sensitive adhesive layer 40 which comprises tacky polymeric microspheres underlies a rear surface 45 of the backing layer 15 so as to firmly secure the wall covering 10 to a surface while allowing it to be repositionable upon installation, releasable after extended use, and be separated from another wall covering if the two are inadvertently bonded together. Optionally, a polymeric primer layer 50 may be positioned between the rear surface 45 of the reinforcing backing layer 15 and the pressure sensitive adhesive layer 40 to allow for improved anchorage of the adhesive to the backing layer 15.

The reinforcing substrate or backing layer 15 may be of any suitable material known in the art for use in manufacturing wall coverings, with a basis weight typically ranging from about 50 to about 180 grams per square meter. The backing may, by way of example, be formed from groundwood semi-bleached chemical or mechanical pulp. Other materials which are conventionally used in wallpaper construction include woven or non-woven scrims, spun bonded sheets formed of synthetic fibers or filaments, chemical pulp sheets, and the like. Any appropriate synthetic binders, wet strength resins, sizing agents, fillers, and pigments may also be incorporated into backing layer 15. As an example, backing layer 15 may comprise between 50 to 80 weight percent of hydrophilic cellulose fiber and 20 to 50 weight percent of hydrophobic binders, resins, sizing agents, fillers and pigments. A commercially suitable backing layer is Impstrip™ gravure strippable grade bleached pulp sheet sold by Imperial Wallcoverings of Beachwood, Ohio.

The surfacing layer 20 imparts a smooth ink receptive surface to the sheet and also serves to impart opacity. The surfacing layer is preferably a polymer coating composition, formed from one or more acrylic or vinyl monomers such as vinyl chloride (e.g., vinyl esters and vinyl acetate) The surfacing layer may, for example, comprise a polyvinyl chloride latex composition or an ethylene polyvinyl chloride/acrylic copolymer composition. The vinyl polymer composition preferably contains a relatively high proportion of suitable opacifying pigments or fillers, such as calcium carbonate, kaolin, talc, aluminum hydroxide, or titanium dioxide, to impart high opacity. Coating/surfacing compositions of this type are commercially available from a number of sources, and the selection of a suitable coating/surfacing composition is within the skill of the artisan in this field. One commercially preferred material which may be used in surfacing layer 20 is Airflex 100HS sold by Air Products, Allentown, Pa. In general, the surfacing layer may be applied by conventional coating equipment such as a blade coater, direct or reverse roll coater, an air knife, rod coater, wire wound bar, transfer coater, etc. The coating is thereafter dried, for example, by using hot air or by a heated drum, and may then be calendared to form a smooth surface suitable for gravure printing. The weight of the resulting surfacing layer 20 may typically range from about 5 to about 800 grams per square meter.

The printing layer 30 is applied by conventional printing methods, such as for example by flexo or gravure printing. As an example, one printing technique involves a pattern using 1 to 7 color inks, which can be applied by rotogravure or other methods which may be aesthetically preferred. Selection of the particular solvent- or water-based inks employed is within the skill of a person working in this field, depending upon the particular solvent or water type of printing involved and the colors and patterns employed.

The top coat layer 35 is applied after application and drying of the printing layer 30, and is applied as a solvent-based, emulsion coating, or UV cured composition by any suitable coating method such as by rollers, air knife wire wound bar, a reverse roll coater, offset transfer coater, or by gravure printing.

The top coating composition may be a volatile solvent-based composition predominantly comprised of one or more polymers derived from vinyl monomers such as vinyl chloride or vinyl esters. Examples of vinyl esters include vinyl acetate, vinyl propionate, vinyl butyrate, vinyl pivilate, vinyl laurate and vinyl versarate, with vinyl acetate being preferred. The vinyl monomers may be copolymerized with other monomers such as unsaturated carboxylic acid esters, including acrylic acid and methacrylic acid, and/or alpha-olefin monomers, including ethylene and propylene. The top coating polymers may have a molecular weight range from 15,000 to 500,000 and glass transition temperatures ($T_g$) ranging from 20° C. to 105° C. The polymer or polymer mixture may be dissolved in one or more volatile organic solvents such as toluene, methylethyl ketone, methyl isobutyl ketone, ethanol and mixtures thereof. When coated onto the wall covering and dried, the polymer forms a smooth transparent flexible film. The top coating composition may be extended with a clear film forming binder.

The top coating composition may also contain a solvent-based perfluoroalkyl copolymer stain and soil repellant such as dupont solvent-based Telfon® and described in U.S. Pat. No. 4,804,572 to Bodrogi, the disclosure of which is incorporated herein in its entirety by reference. Particularly suitable for use in the present invention are commercially available solvent-soluble polymers and copolymers of perfluoroalkyl acrylates or methacrylates. Examples of polymerizable perfluoroalkyl acrylate or methacrylate monomers include those having the formula: $R_fROCOCR'{=}CH_2$ wherein $R_f$ represents a straight or branched perfluoroalkyl group containing 3 to 15 carbon atoms; R is an alkylene group containing 1 to 10 carbon atoms; and R' is hydrogen or a methyl group.

Additionally, water-based emulsions may comprise the top coat layer 35. These may include duPont water-based Teflon®. In general, such emulsions are preferably applied such that the top coat layer has a dry basis weight of 0.5 to 3 grams per square meter. As an example, emulsions of this type may contain fluorocarbon polymers, more specifically, fluoroalkyl polymers. A commercially suitable fluoroalkyl polymer emulsion is FX845 sold by 3M of St. Paul, Minn. With respect to the application of a top coating containing fluorocarbon polymeric material, the coating should be heated to a temperature of at least 80° C. to promote curing of the material and, more preferably, to a temperature of 90° to 110° C.

In another embodiment, the top coat layer 35 comprises emulsions of silicon-based compounds in water, including, for example, emulsions in which the silicone is crosslinked. Numerous silicon-based compounds may be employed over a wide range of molecular weights such as those containing polysiloxanes including, for example, polydimethylsiloxane and dimethyl hydrogen polysiloxane. A suitable commercial silicone emulsion is GE Silicone 1142-148/SM3010 sold by GE Silicones, Inc. of Waterford, N.Y. The 1142-148/SM3010 emulsion polymer is 32 to 38 percent active, is cationically stabilized using polyethylene glycol (methyloctadecylamino)diethylether chloride, and is supplied at a pH of 4.5 to 6.5. Upon application of a top coating employing a silicone emulsion, it is preferred that the coating be heated to a temperature of at least 145° C. to properly cure the silicone material.

The top coating composition in another embodiment, an ultraviolet curable polymer such as a methacrylate polymer including varying concentrations of silicone (e.g., about 2 to 8 percent by weight).

A particularly suitable methacrylate polymer is Rad-Kote 862 with Rad-Cure SRC-46 silicone additive. The UV curable coating can be made dull to a Gardner range of 12 to 15 @ 30 degrees) via addition of silica and/or maintaining an application thickness of less than about 0.5 mils. Cure can be accomplished using standard or electrodeless lamps with output of about 300 watts/in., the operation of which is within the skill of one in the art.

Another suitable top coating compostion is low softening point polyamide such as Union Camp Micromid® 321 RC.

The top coat layer 35 may also include a suitable flattening pigment for forming a dull or substantially matte finish to the dried coating if desired. Suitable flattening pigments include silica compounds and silicates such as amorphous silicon dioxide and aluminum silicate. The flattening pigment is added to the top coating composition in an amount sufficient to achieve a flat or substantially matte finish. The specific weight percent of flattening pigment required to achieve this low gloss finish may vary depending upon the specific flattening pigments employed, and other factors, but can be readily determined. Flattening may also be accomplished by other conventional techniques such as using an embossing roll. Embossing may also be used for change in surface area to modify the release.

In addition, the coating composition in top coat layer 35 may also include other additives and agents, including anti-blocking agents such as, but not limited to, microcrystalline waxes and polyethylene waxes. Wetting agents may also be used to improve the wetting and coating of the top coat layer 35, especially with respect to silicon emulsions. A commercially suitable wetting agent is Troysol LAC made available from Troy Chemical of East Hanover, N.J. In a preferred embodiment, GE 1142-148/SM3010 may be diluted to 12 weight percent solids, combined with Troysol LAC, and applied to the printing layer 13 using a gravure cylinder with a smoothing bar. Complete cure may be obtained by subjecting the applied coating to a temperature in excess of 145° C.

In accordance with the invention, the pressure sensitive adhesive layer 40 is designed to allow wall covering 10 to adhere to a wall or other appropriate surface for an extended time period while allowing the wall covering to be releasable, i.e., removed cleanly without the use of stripping aids. The adhesive also allows the wall covering to be repositionable during installation, and permit separation of adhesive surfaces if inadvertent bonding occurs during installation.

A wide variety of materials may be employed in the pressure sensitive adhesive as described, for example, in U.S. Pat. Nos. 3,922,464, 4,598,112, 3,620,366, and 4,166, 152, the disclosures of which are incorporated herein by reference in their entirety. These materials may include natural and synthetic rubbers, acrylic ester polymers and copolymers, vinyl acetate polymers and copolymers, polyvinyl alkyl ethers, and polyisobutylene. Monomers which can be used to form such materials include 2-ethylhexyl acrylate, n-butyl acrylate, secbutyl acrylate, 2-methyl butyl acrylate, 4-methyl-2-pentyl acrylate, 2-ethyl hexyl acrylate, isooctyl acrylate, isodecyl methacrylate, butylmethacrylate, and isobornyl acrylate. Acrylic acid esters of non-tertiary alcohols may also be used with the alcohols including, for example, 2-methylbutanol, 3-methylbutanol, 2-ethylbutanol, 4-methylpentanol, 2-propyl-pentanol, n-hexanol, 2-methylhexanol, 4-methylhexanol, 2-hexanol, 2-ethylhexanol, 4-ethylhexanol, 4-methyl-2-pentanol, 2,3,4-triethylhexanol, 2-ethyl-3-methylhexanol, 2-heptanol, 3-heptanol, 3-methylheptanol, 2-ethylheptanol, 2-methyl-4-ethylheptanol, n-octanol, isooctanol, n-decanol, n-dodecanol, 10-chloro-decanol, and 6-methoxyhexanol. The polymer preferably employed for the purposes of the invention is a $C_4$–$C_{12}$ (meth)acrylate polymer.

Additives may also be used in the pressure sensitive adhesive so as to improve tack, and impart firmness, peel adhesion, and softness as desired by the end user. Examples of such additives include, but are not limited to, acrylonitrile, styrene, alpha-methyl styrene. t-butyl styrene, methylmethacrylate, octyl vinyl ether, and vinyl acetate.

Preferably, pressure sensitive adhesive layer 40 is comprised of tacky microspheres formed of the polymeric material described above. The microspheres may range in size between 20 and 200 microns and may be present in the form of a solvent based solution or an emulsion. An emulsion of microspheres may be prepared by any of the well known techniques with cationic, anionic, or non-ionic emulsifiers. The microspheres may be dispersible in any of the appropriate organic solvents and water. A preferred pressure sensitive adhesive comprises microspheres dispersed in water. A commercially preferred example of such a pressure sensitive adhesive is SW-206M manufactured by Paper Conversions, Inc. of Syracuse, N.Y. In particular, the SW-206M adhesive is supplied at 43 percent solids and at a pH of 8 to 10.

Pressure sensitive adhesive layer 40 may be formed by any known and suitable technique. For example, the adhesive may be deposited on the rear surface of the reinforcing backing layer 11 and applied via a knife over roll transfer coating method. Adhesive is preferably applied in an amount such that layer 40 has a basis weight of from about 24 to 28 grams per square meter. The wet thickness after application preferably is of from 2 to 3 mils. Subsequently, the wall covering is transferred to an appropriate heating apparatus (e.g., a gas oven) wherein the wall covering 10 is subjected to conditions suitable to dry the adhesive. Conditions are selected so as to remove a sufficient amount of moisture from the pressure sensitive adhesive while not adversely affecting wall covering properties. After treatment, it is preferred that the pressure sensitive adhesive have a residual moisture content of less than 5% by weight, and more preferably, less than 2.5% by weight. The thickness of the adhesive layer, after drying, preferably ranges from 0.8 to 1.0 mil. It is preferred that the adhesive be tacky, but dry to the touch after being subjected to heating. The moisture content should be less than about 1.5% of the composition by weight.

Preferably, the wall covering 10 is exposed to a humid environment in order to remoisturize the pressure sensitive adhesive so as to form pressure sensitive adhesive layer 40. Remoisturization may be carried out by applying steam or water through the adhesive side of the wall covering either in line during the manufacture of the wall covering 10 or as a separate operation. Preferably, wall covering 10 is transported through the nip of a gravure station during which time water is applied. Directly after water is applied, the wall covering 10 may or may not travel through the nip of two rollers which force the water to be metered off into the pressure sensitive adhesive. During this stage, processing conditions are employed such that wall covering 10 has a net remaining moisture content preferably of from about 3 to 5 percent by weight, and more preferably, about 4.5 weight percent.

After remoisturization, the releasable wall covering 10 may be self-wound in a roll for slitting and packaging. Preferred packaging include wrapping the wall covering into flat pack form using the TRIMZ® configuration employing CRYOVAC D-954 film.

Optionally, as depicted in FIG. 2, a polymeric primer layer SO may be applied between the pressure sensitive adhesive layer 40 and the rear surface 45 of the backing layer 15 so as to provide improved adhesion of the pressure sensitive adhesive layer 40 to reinforcing backing layer 15 and to give a smoother surface for application of the adhesive. The primer may be applied by any appropriate method including a gravure roll, air knife, or Meyer rod method prior to the application of the pressure sensitive adhesive. The primer may be coated so as to have a basis weight of 1 to 3 grams per square meter on a dry basis.

Any suitable materials may be used in forming the primer layer 50, such as, for example, polymers and copolymers comprising vinyl groups, more particularly, polyvinyl alcohol compounds as illustrated in U.S. Pat. No. 4,844,972 to Tedeschi et al., incorporated herein by reference in its entirety. Examples of suitable polyvinyl alcohol-type polymers include, but are not limited to, polyvinyl acetate homopolymer aqueous resin emulsions, acrylic resin aqueous emulsions, vinyl acetate/acrylate copolymer aqueous emulsions, vinyl acetate/ethylene copolymer resin aqueous emulsions, and vinyl acetate/maleate copolymer resin aqueous emulsions. Preferably, primer layer 50 comprises a solution of vinyl alcohol/acetate polymer and amorphous silica in water, in which the polymer and silica comprise about 7 weight percent of the solution. The above polymers can also be combined with a starchy-type component such that the primer is in the form of a paste-like material. Examples of suitable starchy-type components include starches, oxidized starches, ethylated starches, dextrins, and the like. Humectants, defoamers, preservatives, and other fillers may also be added. In general, the primer may be applied at a pH between 3.0 and 3.5. A commercially suitable primer is a Stick-Withit™ polymer PR-02 supplied by Paper Conversions, Inc.

Figure 3:
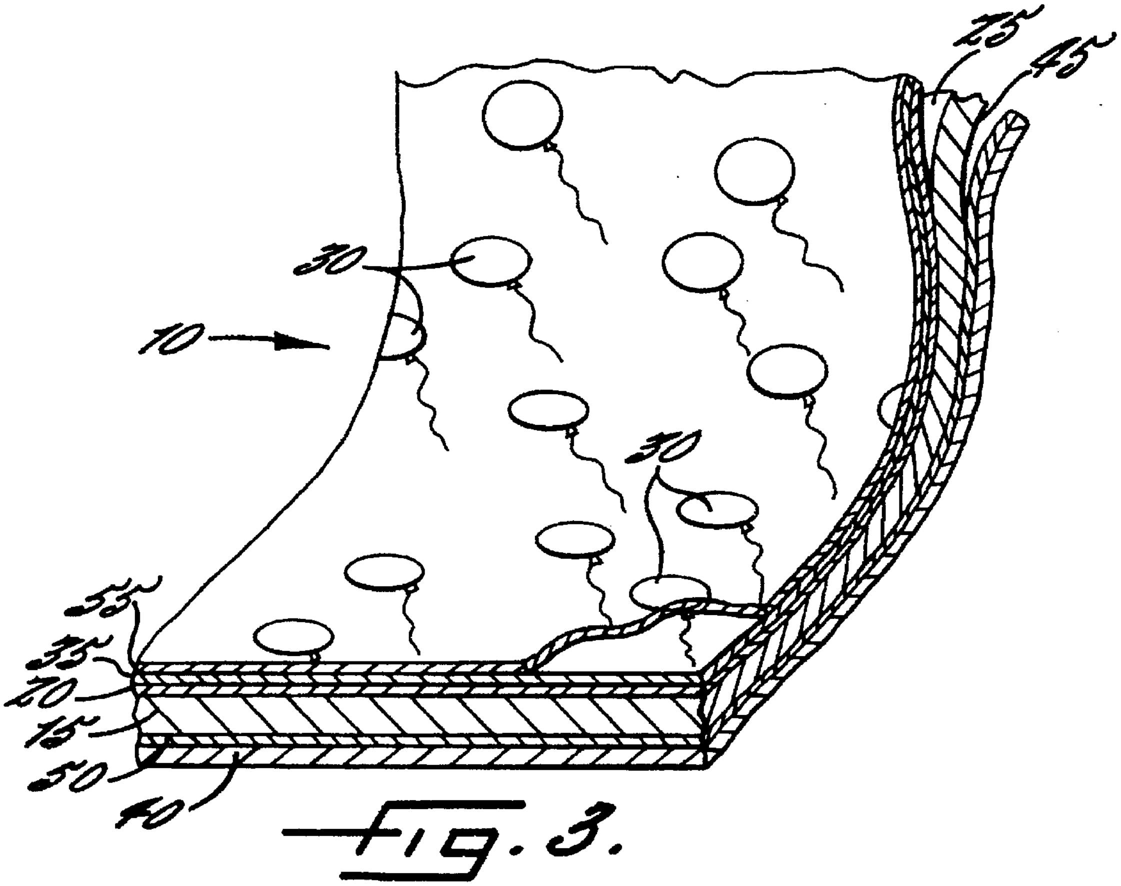
FIG. 3 is a schematic view of the wall covering similar to FIG. 2 with a releasable barrier coat layer added to the wall covering.

FIG. 3 illustrates an additional embodiment of the invention in which a releasable barrier coat layer 55 overlays the transparent top coating layer 35. The releasable barrier coat layer 55 is advantageous in that it serves as both a barrier between the top coat layer 35 and an adhesive layer of an adjacent wall covering which may overlay the top coat layer 35 during storage or transportation of multiple wall coverings. Additionally, layer 35 allows the wall coverings to be unwound with minimal force such that they may be easily released.

Any suitable polymeric material may be used in forming releasable barrier coat layer 55; preferably, a fluorocarbon material is employed and is applied in similar fashion to primer layer 50. In addition, the amount of material applied in forming barrier coat layer 55 is such that it has a similar basis weight to primer layer 50.

The following example is provided to illustrate the releasable wall covering of the invention, but is not construed as a limitation on the invention.

EXAMPLE

A reinforcing substrate layer is provided having the following composition: 69 weight percent cellulose, 12 weight percent binder, 10 weight percent pigment, 8 weight percent size, and 1 weight percent wet strength. The substrate layer has a basis weight of 105 grams per square meter. A water-based surfacing layer which also serves as a decorative coating is formed on the substrate layer, having a basis weight of 28 grams per meter and the following composition: 100 parts latex binder, 127 parts clay, 102 parts $CaCO_3$, 68 parts $TiO_2$, and 15 parts flow modifiers. A releasable barrier layer of fluorochemical material is formed on top of the layer and has a basis weight of 2.5 grams per square meter. A polyvinyl alcohol-acetate polymer/silica primer coating is applied to the back side of the substrate layer. A pressure sensitive adhesive comprising a polyacrylate resin blend is added onto the primer layer and has a basis weight of 26 grams per meter. The adhesive is dried at a temperature between 35° and 65° C. The peel test is used to evaluate adhesive performance and comprises an adhesive/release tester running at 12" per minute at a 90° angle is used to pull 1" wide sample off the substrate layer.

After 30 minutes, 5–15 ounces per inch of adhesive may be removed and after 24 hours, between 10 and 20 ounces per inch may be removed. The adhesive facilitates removal of the wall covering without damaging the wall surface and without the use of stripping aids.

The invention has been described in detail with reference to its preferred embodiments and its example. However, it will be apparent that numerous variations and modifications can be made without departure from the spirit and scope of the invention as described in the foregoing detailed specification and claims.

That which is claimed is:

1. A releasable wall covering comprising a reinforcing backing layer; a surfacing layer formed of a polymer coating overlying a front surface of said backing layer, a layer of printing applied to said surfacing layer and imparting a desired decorative pattern to the wall covering; a transparent top coat layer overlying said layer of printing; and a pressure sensitive adhesive layer underlying a rear surface of said backing layer and comprising tacky polymeric microspheres, wherein said top coat layer contacts a pressure sensitive adhesive layer of an adjacent wall covering to allow for said releasable wall covering to be easily released from the pressure sensitive adhesive of the adjacent wall covering.

2. The releasable wall covering according to claim 1, wherein the tacky polymeric microspheres are dispersed in water and comprise an acrylic polymer.

3. The releasable wall covering according to claim 2, wherein the acrylic polymer is selected from the group consisting of $C_4$–$C_{12}$ (meth)acrylate polymers.

4. The releasable wall covering according to claim 1, wherein the tacky polymeric microspheres range in size between 20 and 200 microns.

5. The releasable wall covering according to claim 1, wherein said transparent top coat layer comprises an emulsion silicone, an ultraviolet curable polymer or a polyamide.

6. The releasable wall covering according to claim 1, further comprising a releasable barrier coating layer comprising a fluorocarbon polymeric material overlying said transparent top coating layer.

7. A releasable wall covering comprising a reinforcing backing layer; a surfacing layer formed of a polymer coating overlying a front surface of said backing layer, a layer of priming applied to said surfacing layer and imparting a desired decorative pattern to the wall covering; a transparent top coat layer overlying said layer of printing; a pressure sensitive adhesive layer underlying a rear surface of said backing layer and comprising tacky polymeric microspheres; and a polymeric primer layer positioned between said pressure sensitive adhesive layer and the rear surface of said reinforcing backing layer, wherein said top coat layer contacts a pressure sensitive adhesive layer of an adjacent wall covering to allow for said releasable wall covering to be easily released from the pressure sensitive adhesive of the adjacent wall covering.

8. The releasable wall covering according to claim 7, wherein the tacky polymeric microspheres are dispersed in water and comprise an acrylic polymer.

9. The releasable wall covering according to claim 8, wherein the acrylic polymer is selected from the group consisting of $C_4$–$C_{12}$ (meth)acrylate polymers.

10. The releasable wall covering according to claim 7, wherein the tacky polymeric microspheres range in size between 20 and 200 microns.

11. The releasable wall covering according to claim 7, wherein said transparent top coat layer comprises an emulsion silicone, an ultraviolet curable polymer or a polyamide.

12. The releasable wall covering according to claim 7, further comprising a releasable barrier coating layer comprising a fluorocarbon polymeric material overlying said transparent top coating layer.

13. A method of producing a releasable wall covering comprising:

providing a reinforcing backing layer;

applying a surfacing layer to a front surface of the reinforcing backing layer;

applying a layer of printing to the surfacing layer so as to impart a desired decorative pattern to the wall covering;

applying a transparent top coat layer over the layer of printing; and forming a pressure sensitive adhesive layer comprising polymeric microspheres on a rear surface of the reinforcing backing layer so as to form a releasable wall covering, wherein the top coat layer contacts a pressure sensitive adhesive layer of an adjacent wall covering to allow for said releasable wall covering to be easily released from the pressure sensitive adhesive of the adjacent wall covering.

14. The method according to claim 13, wherein said step of forming the pressure sensitive adhesive layer comprises:

depositing pressure sensitive adhesive comprising polymeric microspheres to the rear surface of the reinforcing backing layer;

subjecting the pressure sensitive adhesive to conditions sufficient to remove moisture from the pressure sensitive adhesive containing the polymeric material forming the microspheres; and exposing the wall covering to a humid environment such that the paper is remoisturized through the pressure sensitive adhesive.

15. The method according to claim 13, wherein said step of forming a pressure sensitive adhesive layer comprises forming a pressure sensitive adhesive layer comprising polymeric microspheres which comprise an acrylic polymer.

16. The method according to claim 15, wherein the acrylic polymer is selected from the group consisting of $C_4$–$C_{12}$ (meth)acrylate polymers.

17. The method according to claim 13, wherein said step of forming a pressure sensitive adhesive layer comprises forming a pressure sensitive adhesive layer comprising polymeric microspheres which range in size between 20 and 200 microns.

18. The method according to claim 13, wherein said step of applying a transparent top coat layer comprises applying a transparent top coat layer comprising an emulsion silicone, an ultraviolet curable polymer or a polyamide.

* * * * *